(12) United States Patent
Reed

(10) Patent No.: US 8,001,708 B1
(45) Date of Patent: Aug. 23, 2011

(54) LIFT ATTACHMENT FOR SKID LOADER

(76) Inventor: Rodney A. Reed, South Wayne, WI (US)

( * ) Notice: Subject to any disclaimer, the term of this patent is extended or adjusted under 35 U.S.C. 154(b) by 400 days.

(21) Appl. No.: 12/275,440

(22) Filed: Nov. 21, 2008

(51) Int. Cl.
*A01G 23/06* (2006.01)

(52) U.S. Cl. .......................................................... 37/302

(58) Field of Classification Search .................... 37/302, 37/303, 403–409, 301, 466, 468; 414/724, 414/729, 723, 697, 685, 704; 294/68.23, 294/68.1, 68.21, 111; 144/34.1, 24.12, 34.6
See application file for complete search history.

(56) References Cited

U.S. PATENT DOCUMENTS

| | | | | |
|---|---|---|---|---|
| 4,372,063 A | * | 2/1983 | Work | 37/301 |
| 4,808,062 A | * | 2/1989 | Bare | 414/703 |
| 5,485,691 A | | 1/1996 | Stevens et al. | |
| 5,688,102 A | | 11/1997 | Vieselmeyer | |
| 5,901,477 A | * | 5/1999 | Weaver | 37/302 |
| 6,098,320 A | * | 8/2000 | Wass | 37/406 |
| 6,267,547 B1 | * | 7/2001 | Lund | 414/697 |
| 6,308,440 B1 | | 10/2001 | Mueller | |
| 6,439,279 B1 | * | 8/2002 | Underwood | 144/34.6 |
| 6,601,891 B1 | | 8/2003 | Gregory, Jr. | |
| 6,718,662 B1 | | 4/2004 | Schaff | |
| 6,763,618 B1 | | 7/2004 | Moran | |

OTHER PUBLICATIONS

"Skid Steer 'Extractor' Great for Close-Up Work," Farm Show Magazine, Nov.-Dec. 2007.

* cited by examiner

*Primary Examiner* — Robert Pezzuto
(74) *Attorney, Agent, or Firm* — Craig A. Fieschko, Esq.; DeWitt Ross & Stevens S.C.

(57) ABSTRACT

A hydraulically operated attachment for a skid loader or the like provides for the easy removal of large trees and the lifting of other heavy objects. The lift attachment includes a frame, a base portion extending forward from the bottom of the frame, a lifter portion hingedly attached to the top of the frame, and a hydraulic cylinder for moving the lifter portion from a down position to a raised position.

20 Claims, 3 Drawing Sheets

LIFT ATTACHMENT FOR SKID LOADER

FIELD OF THE INVENTION

The present invention pertains generally to attachments for skid loaders, and, more particularly, to hydraulically operated attachments for skid loaders that are adapted for digging and lifting, such as for digging out and lifting rooted trees or other objects.

BACKGROUND OF THE INVENTION

A skid loader or skid steer loader is a rigid frame, engine-powered machine with lift arms used to attach a wide variety of labor-saving tools or attachments. Though sometimes they are equipped with tracks, skid-steer loaders typically are four wheel drive vehicles with the left-side drive wheels independent of the right-side drive wheels. By having each side independent of the other, wheel speed and direction of rotation of the wheels determine the direction the loader will turn. Skid steer loaders are capable of zero-radius, "pirouette" turning, which makes them extremely maneuverable and valuable for applications that require a compact, agile loader.

The conventional bucket of many skid loaders can be replaced with a variety of specialized buckets or attachments, many powered by the loader's hydraulic system. All newer skid loaders have a connection for external hydraulic systems, so that hydraulics on the attached equipment can be connected readily to the loader's hydraulic system. Such skid loader attachments include backhoes, hydraulic breakers, pallet forks, angle brooms, sweepers, augers, mowers, snow blowers, stump grinders, tree spades, trenchers, dumping hoppers, rippers, tillers, grapplers, tilters, rollers, snow blades, wheel saws, cement mixers, and wood chippers.

With so many convenient attachments available, just about anyone who has access to skid loader wants to use it for as much of their work as possible. However, no currently available skid loader attachment is capable of removing large trees that are rooted in the ground. For this type of work a bulldozer or other large machine typically is required.

A skid loader attachment sold as the "Extractor" uses the concept of hydraulic force against the ground to pull out or lift an object. This device, however, requires that a bush or small tree to be lifted by the device be attached to the device using a chain. Thus, using this device, it would take several minutes for the operator to pull up to a small tree, get out of the skid loader, get back in and seat-belted, and then lift the tree, maybe. Furthermore, this attachment is only useful for pulling small trees and shrubs. A wise operator would not even attempt to remove a large tree by the roots using such an attachment.

Another skid loader attachment product that may be used to pull out trees is the Extreme stump bucket. But this product does not employ a hydraulic cylinder and is generally ineffective for this purpose.

What is desired, therefore, is an attachment for a skid loader that is no larger than an ordinary skid loader bucket but that allows a user to lift out large trees at the roots quickly and easily and to lift other heavy objects as well.

SUMMARY OF THE INVENTION

The present invention provides a lift attachment for skid loaders that may be used to dig under and hydraulically lift out a tree and its roots quickly. A skid loader attachment in accordance with the present invention is able to remove trees at the roots in seconds without the operator ever having to leave his seat in the skid loader. Using a skid loader attachment in accordance with the present invention even large trees can be removed by the roots and carried away in minutes.

A lift attachment for skid loaders in accordance with the present invention operates on the same principle as a hydraulic floor jack. Two protruding tines of a moveable lifter portion of the lift attachment are pushed into the ground and hooked under a tree. Then an attached hydraulic cylinder is used to lift the lifter portion and thus to lift the tree out of the ground. For very large trees an operator would work the lift attachment around the base of the tree to first pull up all of the large roots one-by-one, and then take out the whole tree. Small trees or shrubs can just be pinched and pulled out without digging under them, even ones on the other side of a fence. Thus, a lift attachment in accordance with the present invention can be taken into a lot or a fencerow and used to remove one tree without destroying several others or the fence. In many cases a skid loader with a lift attachment in accordance with the present invention is capable of rooting out a tree without even using the hydraulics of the device. When the tree is on the ground the hydraulics of a lift attachment in accordance with the present invention can be used to raise the lifter portion to grab the tree and carry it away. The simplicity of use, capability, and speed of a lift attachment in accordance with the present invention is beyond anything currently known or available. Other devices that can dig under a tree of comparable size cannot match the speed and ability of a lift attachment in accordance with the present invention.

A lift attachment in accordance with the present invention is also particularly well adapted to lifting heavy objects on soft ground with ease and speed. Thus, a lift attachment in accordance with the present invention also doubles as a jack for large or small machinery on soft ground. A lift attachment in accordance with the present invention can lift objects of several tons on soft or unstable ground, such as a piece of farm machinery with a flat tire in a sodden field, in just seconds.

Further objects, features, and advantages of the invention will appear more fully from the following detailed description of the invention made in conjunction with the accompanying drawings.

DETAILED DESCRIPTION OF THE INVENTION

Figure 2:
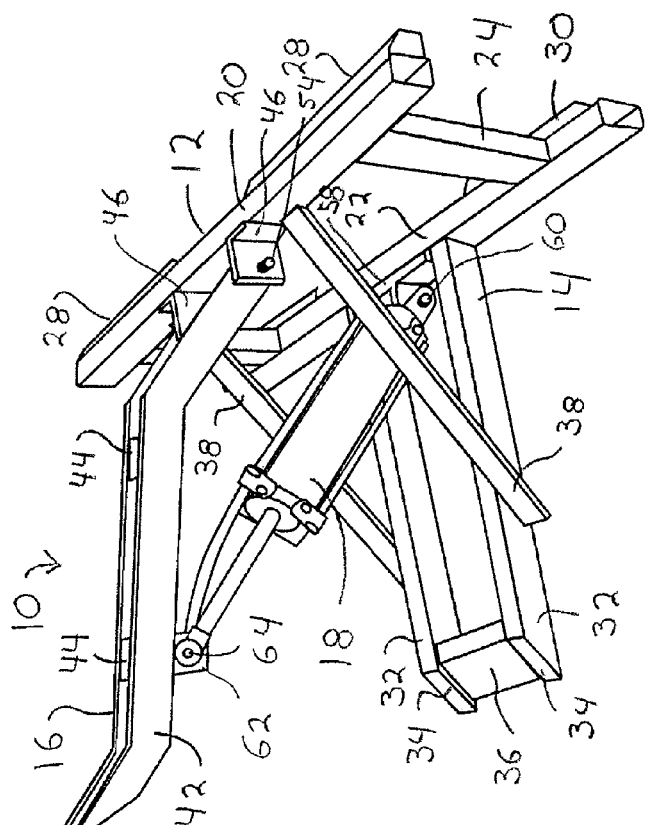
FIG. 2 is a perspective view illustration of the exemplary lift attachment of FIG. 1, showing the lifter portion thereof in a raised or lifting position.

An exemplary lift attachment 10 in accordance with the present invention now will be described in detail, beginning with FIGS. 1-3. The main components of a lift attachment 10 in accordance with the present invention include a frame 12, a horizontal base portion 14 fixedly attached to the frame 12, and a moveable lifter portion 16 moveably attached to the frame 12 and adapted to be actuated by a hydraulic cylinder 18.

The frame 12 of the lift attachment 10 provides the support structure for the other components of the lift attachment 10, as well as the structure by which the lift attachment 10 is mounted to a skid loader. As illustrated best in FIG. 3, the frame 12 may be formed from top 20 and bottom 22 elongated horizontal frame pieces that are parallel to each other, separated from each other, and joined together by separated parallel vertical frame pieces 24 and 26 that are perpendicular to the top 20 and bottom 22 pieces and positioned at or near the ends of the top 20 and bottom 22 pieces. The top 20, bottom 22, and vertical 24, 26 frame pieces thus form a substantially rectangular frame structure 12. For exemplary purposes only, the top 20 and bottom 22 frame pieces may be formed of 2 inch by 3 3/16 inch hollow steel tubing and may be approximately 46 inches long. The vertical frame pieces 24 and 24 may be made of the same steel tubing material as the top 20 and bottom 22 pieces and welded at the ends thereof to the top 20 and bottom 22 pieces to form the frame 12. If the vertical frame pieces 24 and 26 are selected to be approximately 13 inches long, the overall size of the frame 12 will be approximately 46 inches wide by 19 inches high. It should be understood, however, that any other appropriate materials may be used to form a frame 12 having the same or different dimensions from those provided by example herein.

Appropriate structures are provided on a back side of the frame 12 whereby the frame 12, and thus the entire lift assembly 10, is mounted on the lift arms of a skid loader. In the present example, such mounting structures include two downward opening pocket structures 28 that are formed on the back side of the top frame piece 20 and two downward slanting plate structures 30 formed on the back side of the bottom frame piece 22. These mounting structures 28 and 30 are positioned with respect to each other on the frame 12 so as to be engaged by corresponding mounting structures on the lift arms at the front end of a skid loader, whereby the entire lift attachment 10 in accordance with the present invention may be mounted on the skid loader for use. The exemplary mounting structures 28 and 30 may be formed from sheet steel material that is cut and welded to form the structures 28 and 30 that then may be welded to the frame 12 in the appropriate positions. It should be understood, however, that various other and different mounting structures may be provided on the frame 12, and made from other appropriate materials and by other appropriate methods, depending upon the corresponding mounting structures provided on the skid loader to which the lift attachment is to be mounted.

The horizontal base portion 14 extends perpendicularly from the front side (the side opposite to the side to which the mounting structures 28 and 30 are attached) of the frame 12. The horizontal base portion 14 extends from the center of the bottom piece 22 of the frame 12 and may be formed of two separated parallel horizontal base portion leg pieces 32. For example, the base portion leg pieces 32 may be made of 2 inch by 3 3/16 inch steel tube that is attached to the bottom piece 22 of the frame 12 by welding. The base portion leg pieces 32 preferably may be approximately 32 inches long and separated from each other by a distance of approximately 8 inches. The distal ends 34 of the horizontal leg pieces 32 preferably may be angled such that the leg pieces 32 are somewhat longer along the bottom thereof than along the top thereof, thereby providing a pointed distal end of the base portion 14. It should be understood that other appropriate materials may be used to form leg pieces 32 having the same or different dimensions from those described herein.

A connector piece 36, which may be made of the same steel tube material as the leg pieces 32, is welded between the leg pieces 32 at the distal ends thereof 34 at an angle that corresponds to the angled distal ends 34 of the leg pieces 32. The connector piece 36 provides support at the distal end 34 of the horizontal base portion 14 and forms a backstop for the lifter portion 16.

Further support for the base portion 14 may be provided by two straight support pieces 38. Each support piece 38 is connected at one end along the length of one of the leg pieces 32 (e.g., approximately 11 inches from the distal end 34 of the leg piece 32) and at the other end to the top piece 20 of the frame 12. Each support piece 38 may be implemented, for example, using a 2 inch by 3/8 inch steel bar or similar structure cut to the appropriate length and welded at the ends thereof to the leg pieces 32 and the top piece 20 of the frame 12. It should be understood that other structures and materials may be used to provide support for the base portion 14 as appropriate and desired.

The moveable lifter portion 16 is moveably attached at one end thereof to the top piece 20 of the frame 12 on the frond side and at the center thereof. In its down or lowered position, the lifter 16 extends perpendicularly from the top piece 20 and parallel with the base portion 14 for a distance of approximately 12 inches. The lifter 16 then extends downward from this point (e.g. for approximately 24 inches) at an angle to a position adjacent to the backstop connector piece 36 on the base portion 14. The lifter 16 then extends forward, e.g. for an additional approximately 8 inches, from the backstop 36. The distal end 40 of the lifter 16 preferably is pointed.

The moveable lifter portion 16 may be formed from 2 inch by 3 3/16 inch steel tubing that is cut and welded together, or otherwise formed, into two lifter tines 42 having the shape as just described. The two lifter tines 42 are connected together by a plurality (preferably at least two) cross pieces 44, that may be made of the same material as the tines 42 and that are welded between the tines 40 at a plurality of locations along the length thereof. With the cross pieces 44 selected to be approximately 4 inches long, the overall width of the lifter portion 16 will be approximately the same as the distance between the leg pieces 32 forming the base portion 14. Thus, when in the down position, the lifter tines 40 will rest against the backstop piece 36 between the leg pieces 32.

The lifter portion 16 is attached in a hinged relation at the proximal end thereof to the frame 12 at or near the center top thereof. For example, the lifter portion 16 preferably may be attached in a hinged relation to the front side of the top frame piece 20 at the center thereof. Thus, a hinge bracket preferably is provided for this purpose on the top frame piece 20.

Figure 1:
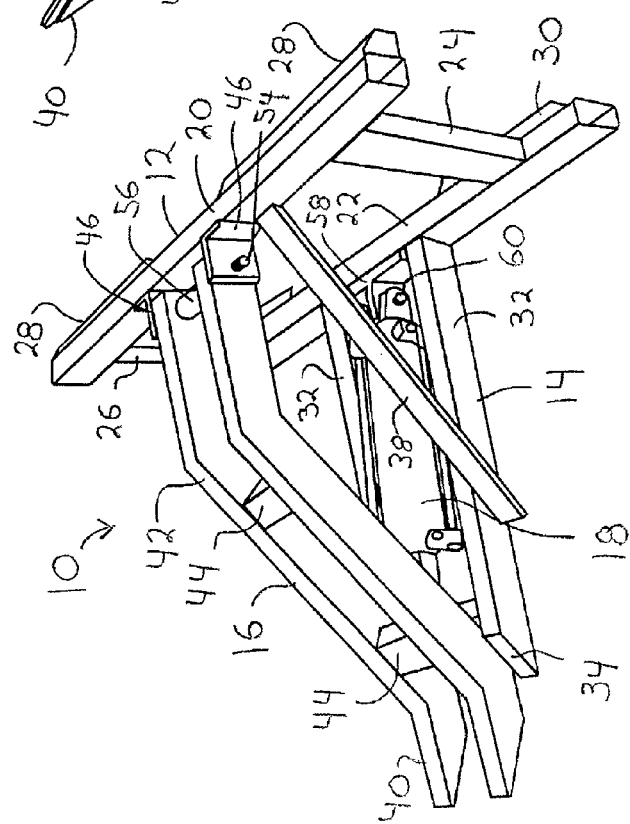
FIG. 1 is a perspective view illustration of an exemplary lift attachment in accordance with the present invention, showing a lifter portion thereof in a down position.

As illustrated in FIGS. 1 and 2, this top hinge bracket may be formed from two L-shaped hinge bracket pieces 46. The L-shaped hinge bracket pieces 46 are attached to the top frame piece 20 at one side of the L, with the other side of the L extending forward perpendicularly from the top frame piece 20. Hinge pin apertures are formed in the extending portions of the bracket pieces 46 and the bracket pieces 46 are attached to the top frame piece 20 such that the distance between these hinge pin apertures is slightly larger than the width of the proximal end of the lifter portion 16.

Figure 3:
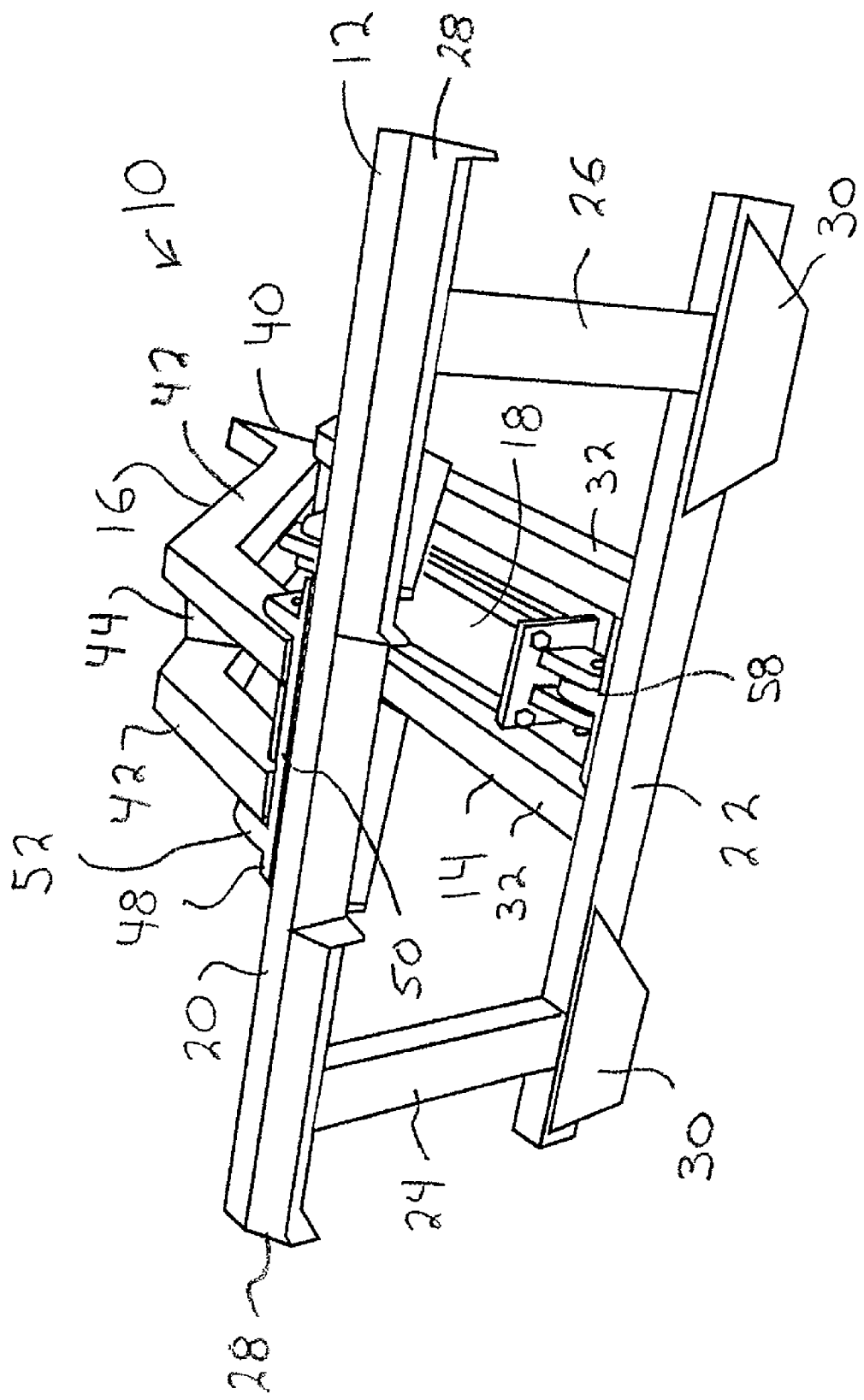
FIG. 3 is a rear perspective view illustration of the exemplary lift attachment of FIG. 1.

Alternatively, and preferably, the top hinge bracket may be formed as a single bracket piece 48, as illustrated in FIG. 3. In this case, the bracket piece 48 includes an elongated base portion 50 and two extending portions 52 extending perpendicularly from the base portion. Hinge pin apertures are formed in the extending portions 52 of the bracket piece 48, and the extending portions 52 are positioned separated along the base portion 50 such that the distance between the hinge pin apertures is slightly larger than the width of the proximal end of the lifter portion 16. For example, the base portion 50 may be approximately 12 inches long, with each extending portion 52 attached thereto approximately one inch in from each end of the base portion. The bracket piece 48 is attached to the front side of the top frame piece 20 via the elongated base portion 50 thereof such that the extending portions 52 extend forward perpendicularly from the top frame piece 20.

The bracket pieces 46, 48 may be formed from flat iron pieces, e.g., 3 inch wide by ⅜ inch thick flat iron pieces, that are cut and welded together or otherwise formed into the desired shape of the bracket pieces 46, 48. The bracket pieces 46, 48 so formed may then be welded to the front side of the top frame piece 20. It should be understood, however, that other bracket pieces having different dimensions, made of different materials, made by different methods, and/or attached to the top frame piece 20 in a different manner from that described herein may also be used.

The distal end of the lifter portion 16 is moveably attached to the bracket pieces 46 or 48 in a hinged relationship via a hinge pin 54. Hinge pin apertures are formed through the lifter portion 16 near the proximal end thereof. These hinge pin apertures in the lifter portion 16 are aligned with the hinge pin apertures formed in the top hinge brackets 46 or 48 by positioning the proximal end of the lifter portion 16 between the extending portions of the top hinge bracket 46 or 48. The hinge pin 54 is then extended through the aligned hinge pin apertures in the lifter portion 16 and in the top hinge bracket 46 or 48 to attach the lifter portion 16 in a moveable hinged relation to the frame 12.

A bushing 56 may be mounted between the two lifter tines 42 at the proximal end of the lifter portion 16. The bushing 16 may be formed from a tubular material, e.g., a 1 inch diameter piece of tubing, that is welded to the lifter tines 42 such that the tube passageway is aligned with the hinge pin apertures formed in the lifter tines 42 at the proximal end of the lifter portion 16. Thus, when the lifter portion 16 is mounted to the frame 12 in the manner described, the hinge pin 54 passes through the bushing 56. The bushing thus provides additional structural support for the lifter tines 42 at the hinge point.

The hydraulic cylinder 18 is attached in a hinged relation at one end thereof to the frame 12, at or near the bottom of the frame 12, and at the other end thereof to the lifter portion 16, near the distal end of the lifter portion 16. Any appropriate commercially available hydraulic cylinder 18 may be used. The size and capability of the hydraulic cylinder 18 selected will depend upon the desired size and capability of the lift attachment in accordance with the present invention with which it is to be used. Preferably, the hydraulic cylinder 18 selected includes the appropriate hydraulic connectors for coupling to the hydraulic system of a skid loader to which it is to be attached.

The hydraulic cylinder 18 may be attached at a first end thereof to the bottom frame piece 22 near the center thereof. For this purpose an appropriate bracket 58 may be attached to the front side of the bottom frame piece 22 at or near the center thereof. The bracket 58 includes a hinge pin aperture formed therein such that the first end of the hydraulic cylinder 18 may be attached in a moveable hinged relation to the bracket 58, and thus to the frame 12, by use of a hinge pin 60 extending though the hinge pin aperture. The bracket 58 may be formed from flat iron pieces in the manner of the hinge brackets 46, 48 described above and welded to the bottom frame piece 22. It should be understood, however, that other structures, possibly made of different materials, made by different methods, and/ or attached to the frame 12 in a different manner, may be used to attach the first end of the hydraulic cylinder 18 to the frame in a hinged relation, depending particularly upon the mounting structure that is provided at the first end of the hydraulic cylinder 18 by the manufacturer thereof.

It should be noted that in the exemplary embodiment described and illustrated the first end of the hydraulic cylinder 18 is attached to the frame 12 at a position thereon adjacent to the base portion 14. Alternatively, the first end of the hydraulic cylinder 18 may be attached to the base portion 14 at a position thereon adjacent to the frame 12. In either case the position of the first end of the hydraulic cylinder 18 is substantially the same and the desired leverage is achieved.

The second end of the hydraulic cylinder 18 preferably is attached in a hinged relation to the lifter portion 16 near the distal end thereof. By this it is meant that the second end of the hydraulic cylinder 18 is attached to the lifter portion 16 at a position along the length of the lifter portion 16 that is closer to the distal end of the lifter portion 16 than to the center of the lifter portion along the length thereof. For example, the second end of the hydraulic cylinder 18 preferably is attached to lifter portion 16 at a position on the lifter portion 16 that is located just above the backstop piece 36 when the lifter portion 16 is in the down position, as illustrated in FIG. 1. For this purpose an appropriate mounting bracket 62 may be attached to the lifter portion 16 at the desired position thereon. The mounting bracket 62 has a hinge pin aperture formed therein, such that the second end of the hydraulic cylinder 18 may be attached in a moveable hinged relation to the mounting bracket 62, and thus to the lifter portion 16, by a hinge pin 64 extended through hinge pin aperture. The mounting bracket 62 may be formed in the manner of the hinge brackets 46, 48 described above and welded to the lifter portion 16 in the desired location. It should be understood, however, that other structures, possibly made of different materials, made by different methods, and/or attached to the lifter portion 16 in a different manner, may be used to attach the second end of the hydraulic cylinder 18 to the lifter portion 16 in a hinged relation, depending particularly upon the mounting structure that is provided at the second end of the hydraulic cylinder 18 by the manufacturer thereof.

Figure 4:
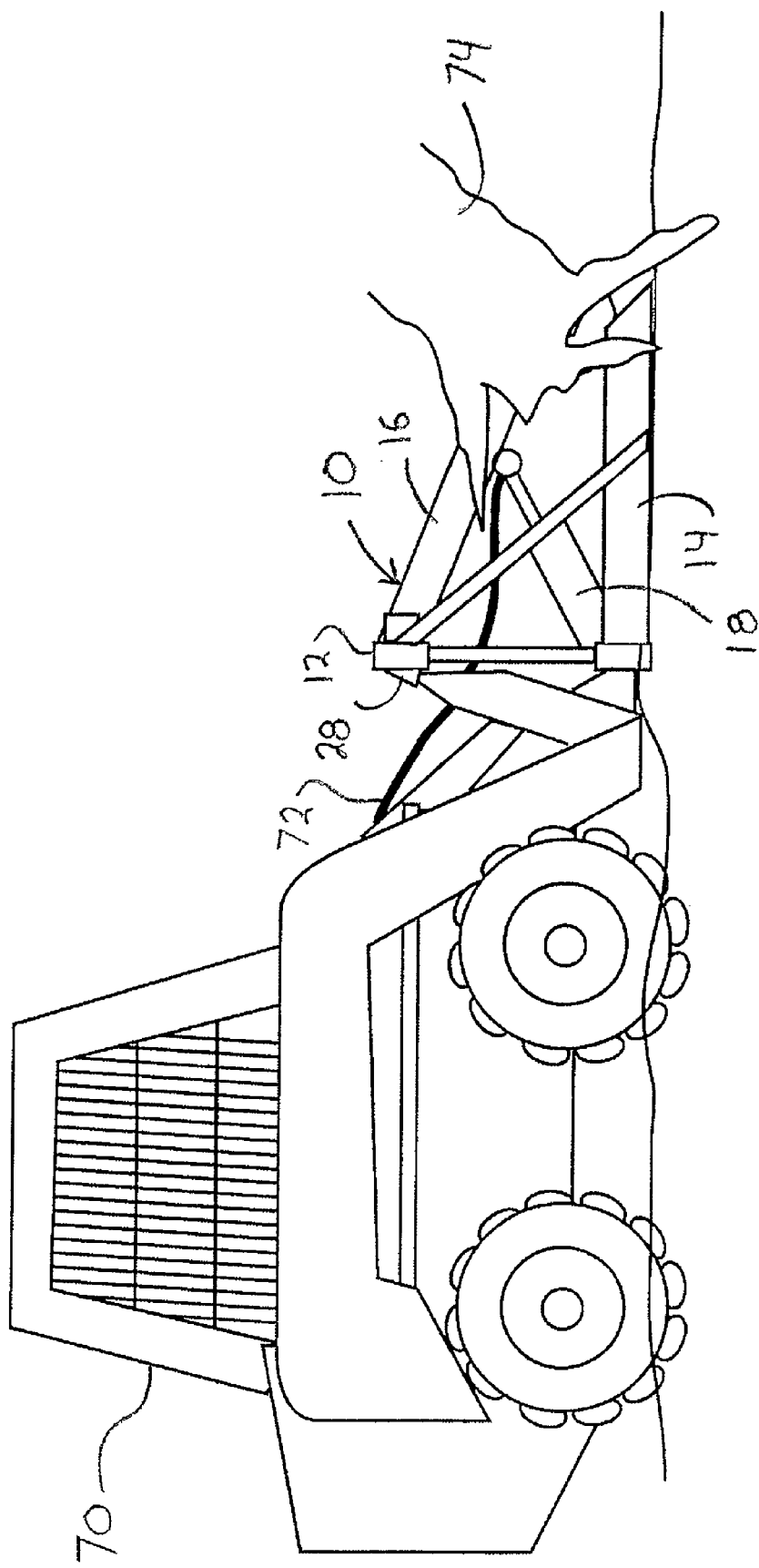
FIG. 4 is a side view illustration of an exemplary lift attachment in accordance with the present invention shown attached to a skid loader and in use lifting out a tree at its roots.

Exemplary operation and use of a lift attachment 10 in accordance with the present invention now will be described with reference to FIG. 4. For use, the lift attachment 10 is attached to the lift arms at the front end of a conventional skid loader 70 or similar vehicle, e.g., by use of the appropriate mounting structures 28, 30 on the back side of the frame 12. When so attached to a skid loader 70, the base portion 14 and lifter portion 16 extend forward from the skid loader, and the entire lift attachment 10 may be elevated and tilted by operation of the front end of the skid loader 70 in a conventional manner. The hydraulic cylinder 18 of the lift attachment 10 is coupled, via an appropriate hydraulic coupling structure 72, to the hydraulic system of the skid loader 70, such that the hydraulic cylinder 18 may be actuated by an operator in the cab of the skid loader to raise and lower the lifter 16 between a down position (FIG. 1) and a raised position (FIG. 2).

In use, for example, to remove a large tree 74, the distal end of the lifter 16 is driven into the ground underneath the tree, with the lifter 16 in the down position, by operation of the skid loader 70. The pointed and angled distal ends of the lifter 16 and base portions 14 facilitate driving the lifter 16 into the ground under the tree 74. (For very large trees, the lifter 16 may be driven into the ground around the tree 74 at several points, thereby to sever the major tree roots before removing the tree 74 using the lift attachment 10 in accordance with the present invention.) With the lifter portion 16 in position under the tree 74, the hydraulic cylinder 18 is actuated to move the distal end 40 of the lifter 16 upward to remove the tree 74 from the ground at the roots with minimal impact on the surrounding ground. The base 14 of the attachment 10, which remains against the ground, provides for operation of the hydraulic force of the cylinder 18 between the ground and the lifter portion 16. The position at which the hydraulic cylinder 18 is attached to the lifter portion 16 (near the distal end 40 thereof) and to the frame 12 (adjacent to the base 14) provides enhanced leverage for the hydraulic force applied. In combination, this provides for increased lifting ability, which allows even very large trees to be removed with relative ease using a lift attachment 10 in accordance with the present invention.

A lift attachment 10 in accordance with the present invention thus allows farmers, landscapers, and other operators to remove large trees from along fence lines, along waterways, in a woods, or in other locations where otherwise much larger machinery, that would also likely cause significant collateral damage, would be needed. Small trees can be simply pinched and pulled out using the attachment 10. Larger trees can be dug under and then take out by operation of the hydraulic cylinder 18 in the manner described above. A removed tree can then be grabbed using the attachment 10, e.g., between the distal ends of the base 14 and the lifter 16, and carried off to a pile. All of these operations can be performed by an operator without leaving his seat in the skid loader 70 to which the attachment 10 is attached.

It should be understood that a lift attachment 10 in accordance with the present invention may be used for many applications other than tree removal. For example, other large objects, such as large farm equipment (e.g., a tractor or combine) can be picked up and moved using a lift attachment 10 in accordance with the present invention.

It is understood that the invention is not confined to the particular construction and arrangement of parts herein illustrated and described, but embraces such modified forms thereof as come within the scope of the following claims.

What is claimed is:

1. A lift attachment for a utility vehicle configured to receive tool attachments, comprising:
    (a) a frame having a frame front side opposing a frame back side, and a frame top opposing a frame bottom;
    (b) a base portion extending along a base portion long axis from a base portion first end to a base portion second end,
        (i) the base portion first end being rigidly attached to the frame bottom at the frame front side,
        (ii) the base portion extending forwardly from the frame front side;
    (c) a lifter for lifting objects thereon, wherein:
        (i) the lifter extends from a lifter first end to a lifter second end, the lifter first end being hingedly secured to the frame top at the frame front side; and
        (iii) the lifter extends forwardly from the frame front side and downwardly towards the base portion second end such that the lifter second end rests against the base portion second end when the lifter is in a down position; and
    (d) a hydraulic mechanism having a hydraulic mechanism first end and a hydraulic mechanism second end, wherein:
        (i) the hydraulic mechanism first end is rotatably secured to the frame bottom;
        (ii) the hydraulic mechanism second end is rotatably secured to the lifter; and
        (iii) the hydraulic mechanism is configured to raise the lifter from the down position to an up position.

2. The lift attachment of claim 1 wherein the frame further comprises mounting structures configured to secure the lift attachment to a skid loader.

3. The lift attachment of claim 1 wherein the frame includes an elongated top piece, an elongated bottom piece parallel to the top piece, a first side piece connected between the top piece and the bottom piece and perpendicular to the top piece and to the bottom piece, and a second side piece parallel to and separated from the first side piece connected between the top piece and the bottom piece.

4. The lift attachment of claim 1 wherein the base portion extends perpendicularly from the frame front side.

5. The lift attachment of claim 1 wherein the base portion second end is pointed.

6. The lift attachment of claim 1 wherein the base portion includes two parallel legs rigidly attached to the frame bottom and extends from the frame front side.

7. The lift attachment of claim 1 comprising additionally a backstop formed at the base portion second end such that the lifter second end rests against the backstop when in the down position.

8. The lift attachment of claim 1 wherein the lifter includes two parallel lifter portion tines.

9. The lift attachment of claim 1 wherein the hydraulic mechanism is configured to raise the lifter to the up position by exerting upward forces on the lifter from beneath the lifter.

10. The lift attachment of claim 1 wherein the hydraulic mechanism is configured to be:
    (a) at least substantially parallel with the base portion when the lifter is in the down position; and
    (b) angled with respect to the base portion when the lifter is in the up position.

11. The lift attachment of claim 1 wherein:
    (a) the lifter includes a lifter second portion between a lifter first portion and a lifter third portion; and
    (b) in the down position:
        (i) the lifter first and third portions are at least substantially parallel with the long axis of the base portion; and
        (ii) the lifter second portion extends between the lifter first and third portions at an angle.

12. The lift attachment of claim 1 wherein:
    (a) the frame top has a frame top elevation, and the frame bottom has a frame bottom elevation;
    (b) in the down position, the lifter second end extends downwardly to the frame bottom elevation; and
    (c) in the up position, the lifter rotates with respect to the frame to raise the lifter second end at least up to the frame top elevation.

13. The lift attachment of claim 1 wherein the lifter is configured to lift objects resting thereon as the hydraulic member exerts upwardly force on the lifter.

14. A lift attachment for a utility vehicle configured to receive tool attachments, including:
    (a) a frame having:
        (i) a frame front side opposing a frame back side;
        (ii) a frame top having a frame top elevation; and
        (iii) a frame bottom having a frame bottom elevation;
    (b) a hydraulic mechanism extending forwardly from the frame front side, the hydraulic mechanism having a hydraulic mechanism first end rotatably secured to the frame at the frame bottom; and
    (c) a lifter extending forwardly from the frame front side at the frame top, the lifter extending between a lifter first end to a lifter second end, wherein:
        (i) the lifter first end is rotatably secured to the frame at the frame top; and
        (ii) the lifter is configured to rotate between:
            (1) a down position in which the lifter second end is at the frame bottom elevation; and
            (2) an up position in which the lifter second end is raised above the frame bottom elevation.

15. The lift attachment of claim 14 wherein the hydraulic mechanism further includes a hydraulic mechanism second end secured to the lifter, the hydraulic mechanism second end opposing the hydraulic mechanism first end.

16. The lift attachment of claim 15 wherein:
   (a) the hydraulic mechanism further includes a hydraulic mechanism second end secured to the lifter, the hydraulic mechanism second end opposing the hydraulic mechanism first end;
   (b) the hydraulic mechanism is configured to raise the lifter from a down position to an up position;
   (c) in the down position, the hydraulic mechanism second end is at the frame bottom elevation; and
   (d) in the up position, the hydraulic mechanism second end rises above the frame bottom elevation as the hydraulic mechanism first end rotates with respect to the frame.

17. The lift attachment of claim 14 wherein the hydraulic mechanism is configured to raise the lifter second end by pushing upwardly on the lifter.

18. A lift attachment for a utility vehicle configured to receive tool attachment, including:
   (a) a frame having:
      (i) a frame front side opposing a frame back side; and
      (ii) a frame top opposing a frame bottom;
   (b) a lifter extending forwardly from the frame front side at the frame top, the lifter having a lifter first end and a lifter second end, wherein:
      (i) the lifter first end is rotatably secured to the frame at the frame top, the lifter being configured to rotate with respect to the frame top between a down position and an up position; and
      (ii) the lifter second end extends downwardly from the lifter first end;
   (c) a hydraulic mechanism extending forwardly from the frame front side, the hydraulic mechanism having a hydraulic mechanism first end rotatably secured to the frame at the frame bottom, and a hydraulic mechanism second end opposing the hydraulic mechanism first end, wherein:
      (i) the hydraulic mechanism is configured to transpose the lifter between the down position and the up position; and
      (ii) the hydraulic mechanism second end rises as the lifter rises to the up position.

19. The lift attachment of claim 18 further including a base portion extending along a base portion long axis between a base portion first end and a base portion second end, the base portion first end attached to the base bottom, wherein in the down position of the lifter, the lifter second end rests on the base portion second end.

20. The lift attachment of claim 19 wherein:
   (a) the frame is configured to be secured to a skid loader at the frame back side;
   (b) the lifter is configured to lift objects as the hydraulic member pushes the lifter upwardly; and
   (c) the lifter second end is configured to dig into objects to be lifted.

* * * * *